(12) United States Patent
Newton

(10) Patent No.: US 6,172,834 B1
(45) Date of Patent: *Jan. 9, 2001

(54) SYSTEM AND METHOD FOR ADJUSTING THE SPEED OF TAPE

(75) Inventor: Michael Newton, Santa Ana, CA (US)

(73) Assignee: Aiwa Co., Ltd., Tokyo ( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/122,245

(22) Filed: Jul. 24, 1998

(51) Int. Cl.[7] ................................... G11B 15/46
(52) U.S. Cl. ......................... 360/73.08; 360/73.04
(58) Field of Search .................. 360/69, 71, 73.01, 360/73.04, 73.05, 73.06, 73.08; 242/334, 334.1

(56) References Cited

U.S. PATENT DOCUMENTS

| 3,601,558 | 8/1971 | Sugaya et al. ............... 179/100.2 Z |
| 4,081,211 | 3/1978 | Shigeta et al. ...................... 352/130 |
| 5,014,141 | 5/1991 | Gervais et al. ..................... 360/96.1 |
| 5,224,643 | 7/1993 | Kojima et al. ......................... 226/196 |
| 5,464,167 | * 11/1995 | Fujisawa et al. ................. 360/71 X |
| 5,823,455 | * 10/1998 | Hable et al. .................... 360/96.3 X |

FOREIGN PATENT DOCUMENTS

WO 94/06188   9/1994   (WO) .

* cited by examiner

Primary Examiner—Andrew L. Sniezek
(74) Attorney, Agent, or Firm—Fulbright & Jaworski L.L.P.

(57) ABSTRACT

A cartridge tape drive for use with a tape cartridge includes a temperature sensor for determining the temperature of the tape cartridge and a control device responsive to the temperature sensor for automatically adjusting the speed of the tape when a temperature threshold value is realized. The cartridge tape drive includes a housing including an opening dimensioned to receive the cartridge and a device for supporting the cartridge within the housing, a magnetic head within the housing, a driver for moving the cartridge in operative engagement with the magnetic head, a temperature sensor for determining the temperature of the cartridge when the cartridge is in operative engagement with the magnetic head, and a control device responsive to the temperature sensor for automatically adjusting the speed of the tape when a temperature threshold value is realized.

24 Claims, 2 Drawing Sheets

SYSTEM AND METHOD FOR ADJUSTING THE SPEED OF TAPE

BACKGROUND OF THE INVENTION

1. Field of the Invention

The present invention relates generally to cartridge tape drives, and more particularly to adjusting the speed of tape to optimize operation of cartridge tape drives.

2. Description of the Prior Art

Magnetic tape storage devices are commonly used for the storage of large amounts of digital data because they provide an economical and reliable means for temporary and permanent storage. Because magnetic tape systems inherently rely on sequential recording, access times are substantially longer than other modern storage devices, but at the same time the danger of catastrophic failure is virtually absent. Thus it has become common practice to utilize tape systems as data backup for floppy disk and hard disk files, typically by reading out the entire contents of a random access memory system at the end of the day or other operating period, and retaining this data in storage until the next backup date or time. Where the volume of data is limited, one tape system and tape reel or cartridge may suffice, but where the data base is much larger, many reels or cartridges may be needed.

Tape drive systems have evolved over the past with technical improvements that have resulted in substantial increases in capacity accompanied by significant decreases in size. The cartridge (also called a cassette) used for these applications is very small, the standard cassette being 3.25" inches by 2.5" inches by 0.5" inches, with a nominal tape width of 0.25" inch. Both the data capacity and transfer rate for tape cartridges has increased over the years. For example, the Travan minicartridge, model TR-4, manufactured by Imation Corporation of St. Paul, Minn., has a data storage capacity of 4.0 gigabytes (GB)(uncompressed data) at a sustained transfer rate of 783 kilobytes-per-second (Kbps) when the tape is run at 120 inches per second (ips). Tape cartridges are expected to store 15 or more GB of uncompressed data in the near future.

Despite the technical improvements in tape drive systems including data cartridges, the data transfer rate is limited by the amount of heat which is generated by the cartridge when the tape is operated at its maximum speed of 120 ips. In particular, when the cartridge tape is operated at a relatively high speed for a period of time, such as at 120 ips for half an hour, a substantial amount of heat, due to friction between the components within the cartridge, is developed. After a period of time, such as when the cartridge is run at 120 ips for half an hour, the tape exceeds its safe operating temperature range. The heat must be dissipated to preclude malfunction of the cartridge tape and prevent degradation of the data being transferred.

In an attempt to overcome the above problem, the cartridge tape is commonly run at a slower speed than the specified maximum speed of 120 ips. In many cases, the tape is run at a speed of 90 ips or less. At this lower speed, overheating problems caused by the rubbing of individual components in the tape cartridge, such as the rollers, are minimized.

The obvious drawback to this approach, however, is that the data transfer rate of the tape is compromised. For example, to utilize a tape backup system efficiently, it is preferred to record the backup data at a high data transfer rate during what would normally be down time for the system, e.g. the time between the close of business one evening and the start of business the next morning.

What is needed therefore is an apparatus and method for minimizing the heat generated by the frictional components within the cartridge while optimizing the data transfer rate.

SUMMARY OF THE INVENTION

The preceding and other shortcomings are overcome by the present invention which provides a cartridge tape drive for use with a tape cartridge which includes a temperature sensor for determining the temperature of the tape cartridge and a control device responsive to the temperature sensor for automatically adjusting the speed of the tape when a temperature threshold value is realized. The cartridge tape drive includes a housing including an opening dimensioned to receive the cartridge and a system for supporting the cartridge within the housing, a magnetic head within the housing, a cartridge moveable in operative engagement with the magnetic head, a temperature sensor for determining the temperature of the cartridge when the cartridge is in operative engagement with the magnetic head, and a control device responsive to the temperature sensor for automatically adjusting the speed of the tape when a temperature threshold value is realized.

In another aspect, the present invention provides a method for adjusting the speed of a tape cartridge disposed in a cartridge tape drive, including the steps of receiving the cartridge in a housing of the cartridge tape drive, a method for supporting the cartridge disposed within the cartridge tape drive, moving the cartridge in operative engagement with the magnetic head, determining the temperature of the cartridge with a temperature sensor when the cartridge is in operative engagement with the magnetic head, and adjusting the speed of the tape in response to the temperature sensor when at least one temperature threshold value is realized.

The foregoing and additional features and advantages of this invention will become apparent from the detailed description and accompanying drawing figures that follow. In the figures and written description, numerals indicate the various features of the invention, like numerals referring to like features throughout for both the drawing figures and the written description.

DETAILED DESCRIPTION OF THE PREFERRED EMBODIMENT(S)

Figure 1:
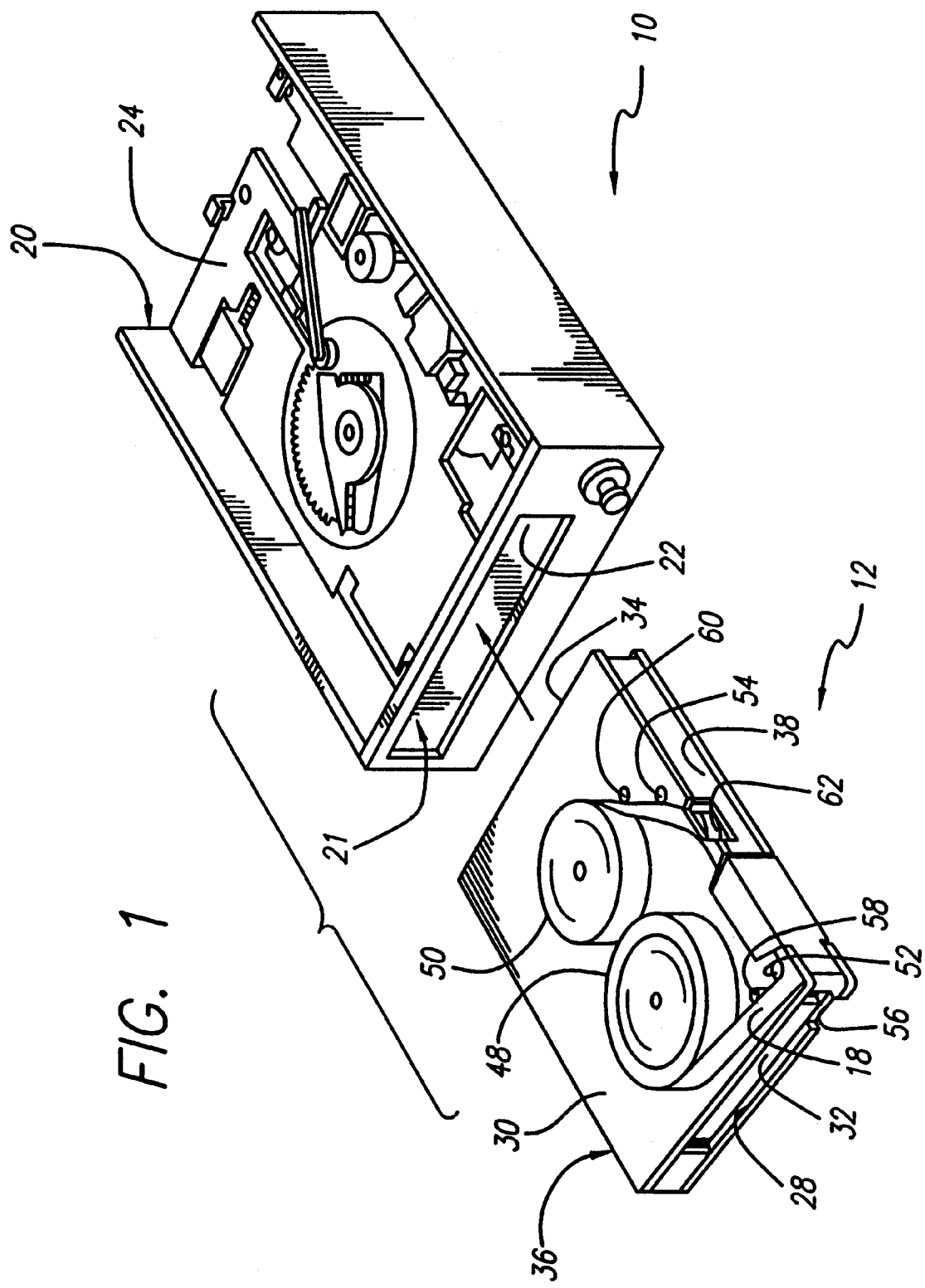
FIG. 1 is a perspective view of a cartridge tape drive assembly in accordance with a preferred embodiment of the present invention and a cartridge for use therein.

As is illustrated in FIG. 1, the present invention provides a cartridge tape drive assembly 10 for use with a tape cartridge 12 which includes a temperature sensor for determining the temperature of the tape cartridge 12 and a controller 14 (FIG. 3) responsive to a temperature sensor 16 (FIG. 2) for automatically adjusting the speed of the tape 18 when one or more temperature threshold values are realized. The cartridge tape drive assembly 10 includes a housing 20 including an opening or access door 22 dimensioned to receive the cartridge 12 and a system for supporting the cartridge 12 within the housing 20, a magnetic head 26 within the housing 20, a mechanism or other means (not shown) for moving the cartridge 12 in operative engagement with the magnetic head 26, a temperature sensor 16 (FIG. 2) for determining the temperature of the cartridge 12 when the cartridge 12 is in operative engagement with the magnetic head 26, and a controller 14 (FIG. 3) responsive to the temperature sensor 16 for automatically adjusting the speed of the tape 18 when a temperature threshold value is realized.

It should be noted that this invention is directed mainly to adjusting the speed of the tape 18 in response to the detected temperature of the cartridge 12.

There is no detailed description of the function and operation of the cartridge tape drive assembly 10. Similarly, although the magnetic head 26 is mounted in the tape drive assembly in such a manner as to allow the head 26 to be moved between various tracks on the tape 18, there is no detailed description of the mounting or track adjusting mechanism. Moreover, the mechanism(s) which open the access door 22 and move the cartridge 12 laterally within the housing 20 into operative engagement with the magnetic head 26 is not described in detail. This is because these elements may vary depending on the desired function of any given drive embodying the present invention. One skilled in the art will thus recognize that the tape drive assembly 10 and tape cartridge 12 illustrated and described herein is not limited to the particular embodiments presented herein.

Moreover, the present invention is not limited to minimizing the heat buildup in a particular cartridge 12. Rather, the present invention may be adapted to minimize heat buildup in any cartridge 12, including those in development. For illustrative purposes, however, the present invention is illustrated with the Travan minicartridge, model TR-4, manufactured by Imation Corporation of St. Paul, Minn. As seen in FIG. 1, the cartridge 12 has a metal base plate 28, a metal top cover 30, two end walls 32 34, a rear side wall 36, and a front side wall 38. The end walls 32 34 are inset slightly from the end edge of the base plate 28 and the top cover 30. The front and rear ends 40 42 of the base plate 28 are each provided with an indexing notch 44 46, respectively, which extends from the edge of the base plate 28 inward to the end wall 32 34. In operational use, the cartridge 12 is supported within the housing 20 of the cartridge tape drive assembly 10.

A pair of spools are rotatably mounted within the cartridge 12. A magnetic tape 18 is wrapped around the spools 48 50 with a portion extending between the spools 48 50. The tape path between the spools 48 50 is defined by idler rollers 52 25 54 such that a portion of the tape 18 between the spools 48 50 extends lengthwise within the cartridge 12 slightly behind the front side wall 38. Posts 56 58 60 provide guidance for the tape 18. A capstan 62, which is accessible through a cut away portion of the cartridge 12, drives a drive belt (not shown) which rotates the spools 48 50 to move the tape 18 from one spool 48 to the other 50.

During operation of the cartridge 12, friction is generated at numerous areas on the cartridge 12 including at the spools 48 50, idler rollers 52 54 and posts 56 58 60. Consequently, the frictional interaction between the drive belt (not shown), tape 18 and the spools 48 50, rollers 52 54 and posts 56 58 60, which are mounted on the base plate 28, causes the base plate 28 to heat up. For example, when the drive operates the tape 18 at 120 ips for some time, typically half an hour, of continuous running, the cartridge 12 heats up to a critical temperature where data can become lost or compromised and heat generated by the cartridge 12 can adversely affect adjacent components inside the cartridge tape drive assembly 10. Generally, the critical temperature is approximately 57° Celsius (C). One skilled in the art will recognize that the critical temperature will depend on variables such as the number of frictional points on a particular cartridge 12, the size of the cartridge 12, the width of the tape 18, tape speed, ambient temperature, and so forth.

Figure 2:
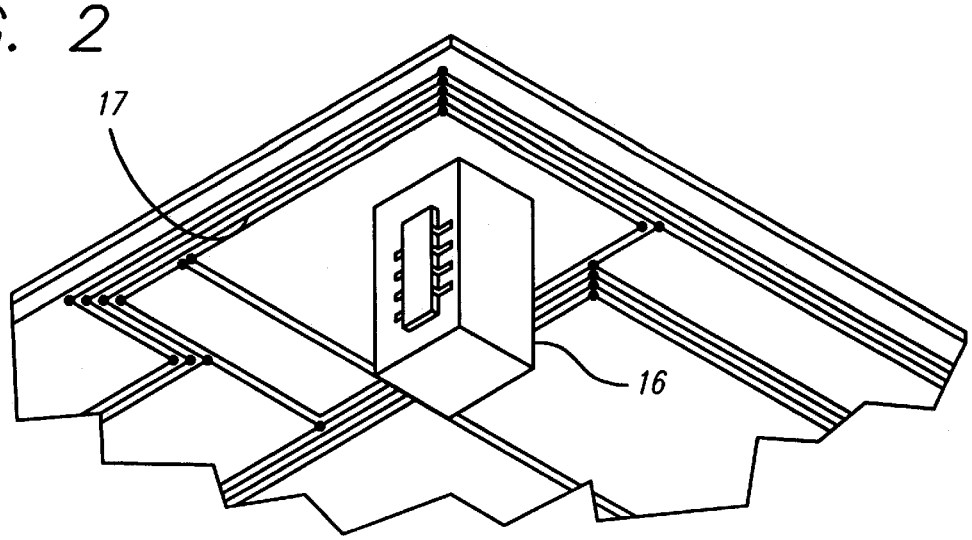
FIG. 2 is a partial isometric view of a circuit board and sensor adapted to be mounted at the top of the assembly of FIG. 1.
Figure 3:
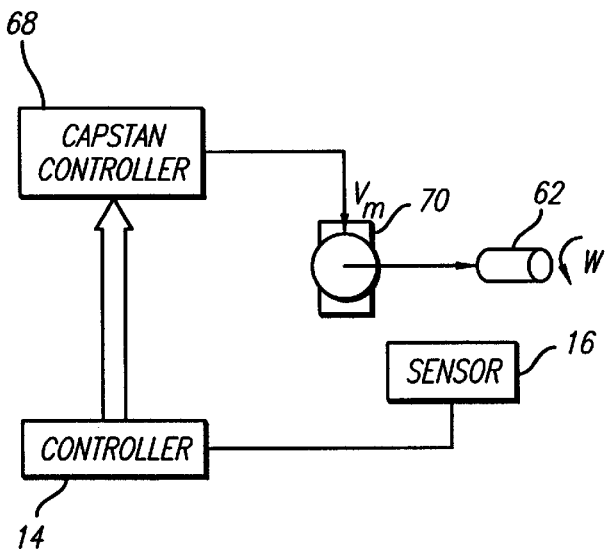
FIG. 3 is a schematic block diagram of the cartridge tape drive assembly of FIGS. 1 and 2 having a controller for transmitting signals to a speed control mechanism for adjusting the speed of the tape in the cartridge tape drive assembly of FIG. 1.

Referring to FIG. 2, in accordance with an advantage of the present Eh invention, a temperature sensor 16 depending downwardly from a circuit board 17 (which not only supports the electronic controller components of FIG. 3, but also forms the rear portion of a top cover of the cartridge tape drive assembly 10 of FIG. 1) senses the temperature of the metal components (base plate 28 and top cover 30) of the cartridge 12, where most of the heat is transferred, and automatically adjusts the speed of the tape 18 when one or more critical temperature values are realized. In particular, when the cartridge 12 is inserted into its operational position through door 21, the temperature sensor 16 is mounted just in front of the front surface of the cartridge 12. The temperature sensor 16 is thus mounted to circuit board 17 such that it is in close proximity to the front edge of the base plate 28 of the cartridge 12 when it has been moved into position for engagement with the magnetic head 26.

Referring to FIG. 3, speed control is achieved by closed loop control which requires temperature feedback information. The temperature information is conveniently provided by the temperature sensor 16 monitoring the temperature of the base plate 28 of the cartridge 12. The temperature sensor 16 is preferably a thermocouple type temperature sensor, such as Model # LM56BIM manufactured by National Semiconductor of Arlington, Tex. One skilled in the art will recognize that the temperature sensor 16 is not limited to the above model, but may be any conventional digital or analog temperature sensor 16 which can adequately provide feedback information to a controller 14 for adjusting the speed of the tape drive assembly 10.

Referring to FIG. 3, in the cartridge tape drive assembly 10, temperature feedback is provided to the controller 14 which compares the temperature detected by the temperature sensor 16 with one or more predetermined temperature limit values. The controller 14 generates a speed adjustment signal when the measured temperature falls outside of the established acceptable temperature range. The speed adjustment signal is applied to the capstan controller 68, which controls the capstan drive motor 70 which in turn drives the capstan 62. The capstan 62, which is accessible through a cut away portion of the cartridge 12, rotates the spools 48 50 to move the tape 18 from one spool 48 to the other 50. The capstan drive motor 70 drives the capstan 62 at a motor shaft speed ω. A speed adjustment signal is thus applied over control line 72 to capstan drive motor 70 to adjust the motor shaft speed ω thereby adjusting the tape speed in accordance with the temperature of the cartridge 12.

In accordance with a primary advantage of the present invention, when the temperature of the cartridge 12 exceeds a predetermined high temperature threshold value, the controller 14 sends a speed adjustment signal to the capstan controller 68 to decrease the speed of the tape 18, which in turn causes the temperature over time to decrease. When the temperature of the cartridge 12 drops below a predetermined low temperature threshold value, the controller 14 sends a speed adjustment signal to the capstan controller 68 to increase the speed of the tape 18 until the high temperature threshold value is realized or exceeded. The cartridge speed may be continuously adjusted in accordance with the predetermined threshold values, resulting in optimal operation of the tape drive assembly 10. Since the high and low temperature threshold values are adjustable, the speed adjustment can be carefully coordinated with the known characteristics of the cartridge 12 and the tape drive assembly 10.

The measured temperature of the cartridge 12 is compared with the threshold values at specific intervals. In accordance with the present invention, the specific intervals may be adjusted. When the sampling interval is decreased, less time is allowed between each determination of the high or low threshold temperature.

In operation, at an initial time $t_0$, the capstan drive motor 70 is at rest and the tape 18 consequently is not in motion. The temperature sensed is the temperature of the base plate 28 at rest. At startup, at time $t_1$ the drive may operate the tape 18 at 120 ips, the maximum speed for the tape 18. During this time, the temperature of the base plate 28 on the cartridge 12 is continuously monitored and compared to the predetermined threshold values. As long as the temperature of the base plate 28 does not exceed the high temperature threshold value, the drive may continue to operate the tape 18 at 120 ips. At time $t_2$, after a period of continuous running, the friction generated by the constant interaction between the drive belt, tape 18 and the spools 48 50, rollers 52 54 and posts 56 58 60, all of which are connected to the base plate 28 of the cartridge 12, causes the base plate 28 to heat up. At this point, if the detected temperature meets or exceeds the high temperature threshold value, the controller 14 sends a signal to the capstan controller 68 to slow the capstan motor 70 down. If at any time the temperature of the base plate 28 falls below a predetermined low temperature threshold, the controller 14 sends a signal to the capstan controller 68 to speed up the capstan motor 70 such that the tape drive assembly 10 can operate at an optimal speed for data transfer. The present invention thus continuously monitors the temperature and adjusts the speed of the cartridge 12 such than optimal data transfer is achieved.

Figure 4:
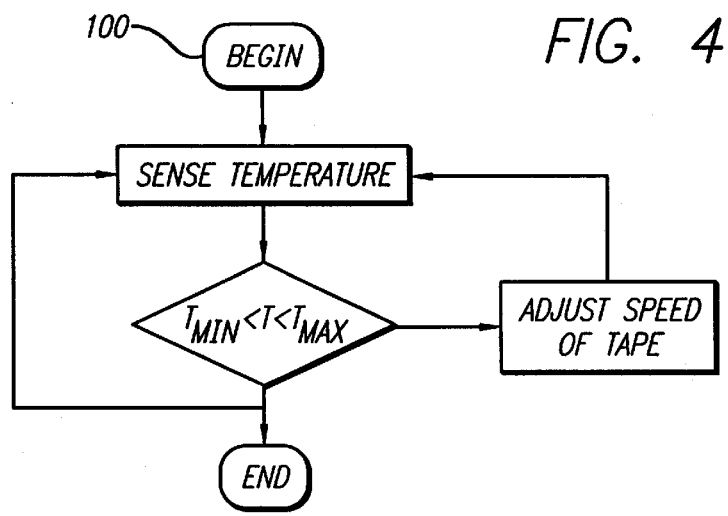
FIG. 4 is a flow chart of an algorithm for using the sensor of FIG. 2 and the controller of FIG. 3 to adjust the speed of the tape in the cartridge tape drive assembly of FIG. 1.

FIG. 4 is a flow chart of an algorithm 100 for adjusting the speed of the tape 18 in the cartridge tape drive assembly 10 of FIG. 4. The algorithm 100 is implemented on a digital microcomputer which uses an input port to sample the temperature of the base plate 28 and an output port for producing a temperature adjustment signal which is applied to the capstan controller 68. As shown in FIG. 5, the procedure begins with sensing the temperature of the cartridge base plate 28 (step 102). As shown in FIG. 4, the capstan drive motor 70 drives the capstan 62 at a motor shaft speed ω. In step 104, a limit check is performed on the temperature determined in step 102. If the temperature does not fall between the minimum and maximum temperature threshold values, a signal is generated and sent to the capstan controller 68 (step 106) to adjust the speed of the capstan motor 70. When the temperature is less than the minimum temperature threshold value, a signal to speed up the capstan motor 70 is sent to the capstan controller 68 (step 108). When the temperature is greater than the maximum temperature threshold value, a signal to slow down the capstan motor 70 is sent to the capstan controller 68 (step 110). If the temperature falls within the minimum and maximum temperature threshold values, no adjustment signal is generated and the speed of the tape 18 is not adjusted (step 112).

It will be appreciated by persons skilled in the art that the present invention is not limited to what has been shown and described hereinabove, nor the dimensions of sizes of the physical implementation described immediately above. For example, the present invention may be used with tape drive assemblies and cartridges currently available or in development. The scope of the invention is limited solely by the claims which follow.

What is claimed is:

1. A cartridge tape drive for use with a tape cartridge, comprising:
   a housing comprising an opening dimensioned to receive the cartridge and a device for supporting the cartridge within the housing;
   a magnetic head within the housing;
   means for moving said cartridge in operative engagement with the magnetic head;
   a temperature sensor for determining the temperature of the cartridge when the cartridge is in operative engagement with the magnetic head; and
   means responsive to the temperature sensor for automatically adjusting the speed of the tape when at least one temperature threshold value is realized.

2. The cartridge tape drive claimed in claim 1, wherein said means responsive to the temperature sensor for automatically adjusting the speed of the tape when at least one temperature value is realized, further comprises:
   at least one predetermined temperature limit value; and
   comparator means for comparing the temperature detected by the temperature sensor with the predetermined temperature limit value.

3. The cartridge tape drive claimed in claim 2, wherein said means responsive to the temperature sensor for automatically adjusting the speed of the tape when at least one temperature threshold value is realized, further comprises:
   a signal generator responsive to the comparator means for producing a speed adjustment signal; and
   speed adjustment means responsive to the signal generator for adjusting the speed of the tape in response to a determination that said temperature threshold value is realized.

4. The cartridge tape drive claimed in claim 3, wherein said temperature sensor for determining the temperature of the cartridge when the cartridge is in operative engagement with the magnetic head, further comprises:
   sampling means for sampling the temperature of the cartridge at a specific interval.

5. The cartridge tape drive claimed in claim 4, wherein the sampling means is adjustable.

6. The cartridge tape drive claimed in claim 5, wherein said temperature sensor for determining the temperature of the cartridge when the cartridge is in operative engagement with the magnetic head, further comprises:
   sampling means for continuously sampling the temperature of the cartridge.

7. The cartridge tape drive claimed in claim 3, wherein said predetermined temperature limit values include a high and low temperature threshold value.

8. The cartridge tape drive claimed in claim 7, wherein said speed of tape is decreased when said high temperature threshold value is realized.

9. The cartridge tape drive claimed in claim 8, wherein said speed of tape is increased when said low temperature threshold value is realized.

10. The cartridge tape drive claimed in claim 9, wherein said temperature sensor is a thermocouple sensor.

11. The cartridge tape drive claimed in claim 1, wherein said cartridge includes a base plate and said temperature sensor is disposed in close proximity to said cartridge base plate for determining the temperature of the cartridge when the cartridge is in operative engagement with the magnetic head.

12. The cartridge tape drive claimed in claim 1, wherein said means responsive to the temperature sensor for automatically adjusting the speed of the tape when at least one temperature threshold value is realized, further comprises:

a controller responsive to said temperature sensor for automatically adjusting the speed of the tape when at least one temperature threshold value is realized.

13. A method for adjusting the speed of a tape cartridge disposed in a cartridge tape drive, comprising the steps of:

receiving said cartridge in a housing of said cartridge tape drive;

supporting said cartridge within said cartridge tape drive;

moving said cartridge in operative engagement with the magnetic head;

determining the temperature of the cartridge with a temperature sensor when the cartridge is in operative engagement with the magnetic head; and adjusting the speed of the tape in response to the temperature sensor when at least one temperature threshold value is realized.

14. The method claimed in claim 13, wherein said step of adjusting the speed of the tape in responsive to the temperature sensor when at least one temperature threshold value is realized, further comprises the steps of:

setting at least one predetermined temperature limit value; and comparing the temperature detected by the temperature sensor with the predetermined temperature limit value.

15. The method claimed in claim 14, wherein said step of adjusting the speed of the tape in responsive to the temperature sensor when at least one temperature threshold value is realized, further comprises the steps of:

generating a speed adjustment signal responsive to said step of comparing the temperature detected by the temperature sensor when the predetermined temperature limit value; and adjusting the speed of the tape in response to receipt of a speed adjustment signal.

16. The method claimed in claim 15, wherein said step of determining the temperature of the cartridge with a temperature sensor when the cartridge is in operative engagement with the magnetic head, further comprises the step of:

sampling the temperature of the cartridge at a specific interval.

17. The method claimed in claim 16, wherein the sampling means is adjustable.

18. The method claimed in claim 17, wherein said step of determining the temperature of the cartridge with a temperature sensor when the cartridge is in operative engagement with the magnetic head, further comprises the step of:

continuously sampling the temperature of the cartridge.

19. The method claimed in claim 15, further comprising the step of:

setting high and low temperature threshold values.

20. The method claimed in claim 19, further comprising the step of:

decreasing said speed of tape when said high temperature threshold value is realized.

21. The method claimed in claim 20, further comprising the step of:

increasing said speed of tape when said low temperature threshold value is realized.

22. The method claimed in claim 21, wherein said temperature sensor is a thermocouple sensor.

23. The method claimed in claim 13, further comprising the step of:

disposing said temperature sensor in said housing in close proximity to said cartridge base plate for determining the temperature of the cartridge when the cartridge is in operative engagement with the magnetic head.

24. The method claimed in claim 13, wherein said step of adjusting the speed of the tape in response to the temperature sensor when at least one temperature threshold value is realized, further comprises the step of:

in response to said temperature sensor, automatically adjusting the speed of the tape when at least one temperature threshold value is realized.

* * * * *